(12) United States Patent
Tsunoda

(10) Patent No.: US 10,683,819 B2
(45) Date of Patent: Jun. 16, 2020

(54) INTERNAL COMBUSTION ENGINE AND METHOD FOR CONTROLLING SAME

(71) Applicant: ISUZU MOTORS LIMITED, Shinagawa-ku, Tokyo (JP)

(72) Inventor: Hiroshi Tsunoda, Chigasaki (JP)

(73) Assignee: ISUZU MOTORS LIMITED, Shinagawa-Ku, Tokyo (JP)

(*) Notice: Subject to any disclaimer, the term of this patent is extended or adjusted under 35 U.S.C. 154(b) by 72 days.

(21) Appl. No.: 16/064,991

(22) PCT Filed: Dec. 21, 2016

(86) PCT No.: PCT/JP2016/088046
§ 371 (c)(1),
(2) Date: Jun. 21, 2018

(87) PCT Pub. No.: WO2017/110847
PCT Pub. Date: Jun. 29, 2017

(65) Prior Publication Data
US 2019/0003410 A1    Jan. 3, 2019

(30) Foreign Application Priority Data
Dec. 22, 2015 (JP) .................................. 2015-249426

(51) Int. Cl.
*F02D 41/00* (2006.01)
*F02D 13/06* (2006.01)
(Continued)

(52) U.S. Cl.
CPC ...... *F02D 41/0087* (2013.01); *F01L 13/0036* (2013.01); *F02D 13/06* (2013.01); *F02D 17/02* (2013.01); *F02D 2041/0012* (2013.01)

(58) Field of Classification Search
CPC ................. F02D 41/0087; F02D 17/02; F02D 2041/0012; F02D 13/06; F01L 13/0036
(Continued)

(56) References Cited

U.S. PATENT DOCUMENTS 5,685,264 A * 11/1997 Allen .................. F01L 13/0005
123/90.16
5,826,557 A   10/1998 Motoyama et al.
(Continued)

FOREIGN PATENT DOCUMENTS

EP    3006700 A1 * 4/2016 ......... F02D 41/0087
JP    S54-057009 A    5/1979
(Continued)

OTHER PUBLICATIONS

International Search Report and Written Opinion for related International Patent Application No. PCT/JP2016/088046, dated Mar. 28, 2017; English translation for ISR provided; 9 pages.

*Primary Examiner* — Mahmoud Gimie
(74) *Attorney, Agent, or Firm* — Procopio, Cory, Hargreaves & Savitch LLP

(57) ABSTRACT

Provided is an internal combustion engine including a control device 40 configured to adjust fuel injection valves 12 and a resting mechanism 30 and thereby executing a control of switching between an all-cylinder operation Oa and a reduced-cylinder operation Or, the all-cylinder operation Oa being an operation in which a combustion cycle is always performed in all of the cylinders 11, and the reduced-cylinder operation Or being an operation in which a combustion cycle is always performed in some cylinders 11 less than a cylinder number Nc, wherein in the reduced-cylinder operation Or, all of the cylinders 11 perform a partial operation in which an operating state and a resting state thereof are repeated.

7 Claims, 9 Drawing Sheets

(51) Int. Cl.
*F02D 17/02* (2006.01)
*F01L 13/00* (2006.01)

(58) Field of Classification Search
USPC .................................................. 123/445, 481
See application file for complete search history.

(56) References Cited

U.S. PATENT DOCUMENTS

| | | | |
|---|---|---|---|
| 6,360,724 B1* | 3/2002 | Suhre | F02D 17/02 123/198 F |
| 6,431,154 B1* | 8/2002 | Inoue | F01L 9/04 123/198 DB |
| 2008/0098969 A1* | 5/2008 | Reed | F02D 13/0215 123/64 |
| 2009/0049895 A1* | 2/2009 | Huber | F02D 41/0087 73/114.02 |
| 2016/0003168 A1* | 1/2016 | Leone | F02D 17/02 123/406.47 |
| 2016/0003169 A1* | 1/2016 | Leone | F02D 41/0087 123/481 |

FOREIGN PATENT DOCUMENTS

| | | | |
|---|---|---|---|
| JP | H10-089108 A | 4/1998 |
| JP | 2004-076677 A | 3/2004 |
| JP | 2004-263614 A | 9/2004 |
| JP | 2008-128080 A | 6/2008 |
| JP | 2013-072310 A | 4/2013 |
| JP | 2015-059565 A | 3/2015 |
| JP | 2015-081555 A | 4/2015 |
| JP | 2015-101959 A | 6/2015 |
| JP | 2015-132225 A | 7/2015 |

\* cited by examiner

INTERNAL COMBUSTION ENGINE AND METHOD FOR CONTROLLING SAME

CROSS-REFERENCE TO RELATED APPLICATIONS

This application is a U.S. National Stage entry of PCT Application No: PCT/JP2016/088046 filed on Dec. 21, 2016, which claims priority to Japanese Patent Application No. 2015-249426 filed on Dec. 22, 2015, the contents of which are incorporated herein by reference.

TECHNICAL FIELD

The present invention relates to an internal combustion engine and a method for controlling the same, and more particularly, to an internal combustion engine and a method for controlling the same, in which, while reducing white smoke occurring upon switching from a reduced-cylinder operation into an all-cylinder operation, an operation range for the reduced-cylinder operation can be expanded and also the reduced-cylinder operation can be performed even if a cylinder number thereof is an odd number.

BACKGROUND ART

As engines (internal combustion engines), an engine which can perform a reduced-cylinder operation, in which a specific cylinder is maintained in a resting state, has been proposed as a measure for reducing fuel consumption (e.g., see Patent Document 1). In such an engine, injection of fuel and operation of intake or exhaust valves in the specific cylinder are stopped and the other operating cylinders are operated as a high-load operation, thereby enhancing a fuel consumption rate.

However, in the resting cylinder, in which injection of fuel and operation of intake or exhaust valves are stopped, a pressure in a combustion chamber thereof is decreased when a piston therein descends. That is, there is a problem that lubricant oil is gathered inside a combustion chamber of a cylinder which is maintained in the resting state during a long time.

Thus, if the cylinder is switched from a reduced-cylinder operation into an all-cylinder operation in a state where the lubricant oil is gathered inside the combustion chamber thereof, the lubricant oil is discharged together with an exhaust gas upon restarting of the all-cylinder operation. In this case, white smoke is likely to significantly occur even if a catalyst is equipped in an exhaust gas passage of the engine.

Also, in the reduced-cylinder operation in which only a specific cylinder is maintained in the resting state, there is a problem in that the reduced-cylinder operation can only be performed by a combination of cylinders having equal intervals or a good cylinder balance. For example, examples of reduced-cylinder operations of an 8-cylinder engine include a 6-cylinder operation and a 4-cylinder operation, and examples of reduced-cylinder operations of a 6-cylinder engine include a 3-cylinder operation and a 2-cylinder operation.

That is, in the reduced-cylinder operation in which only a specific cylinder is maintained in the resting state, a 7-cylinder operation or 5-cylinder operation in the 8-cylinder engine and a 5-cylinder operation in the 6-cylinder engine cannot be performed, thereby causing an output range from the engine during the reduced-cylinder operation to be discontinuous. Therefore, there is a problem that an operation range of the reduced-cylinder operation is narrow. Further, in the case of engines, in which a cylinder number is an odd number, such as a 5-cylinder engine or a 3-cylinder engine, no combination of cylinders having equal intervals or a good cylinder balance for the reduced-cylinder operation in which only a specific cylinder is maintained in the resting state exists and hence it is not possible to perform the reduced-cylinder operation thereon.

PRIOR ART REFERENCE

Patent Document

Patent Document 1: JP-A-2015-081555

DISCLOSURE OF THE INVENTION

Problems to be Solved

An object of the present invention is to provide an internal combustion engine and a method for controlling the same, in which, by equally sequentially resting all cylinders, while reducing white smoke occurring upon switching from a reduced-cylinder operation into an all-cylinder operation, an operation range for the reduced-cylinder operation can be expanded and also the reduced-cylinder operation can be performed even if a cylinder number thereof is an odd number.

Means for Solving the Problems

In order to achieve the above abject, the present invention provides an internal combustion engine including: cylinders having a cylinder number of two or more; a plurality of fuel injection valves and a plurality of intake or exhaust valves which are respectively arranged to the two or more cylinders; a valve drive mechanism configured to open and close the intake or exhaust valves; a resting mechanism configured to cancel an action of the valve drive mechanism to maintain the intake or exhaust valves in a closed state; and a control device configured to adjust the fuel injection valves and the resting mechanism and thereby executing a control of switching between an all-cylinder operation and a reduced cylinder operation, the all-cylinder operation being an operation in which a combustion cycle is always performed in all of the cylinders, and the reduced-cylinder operation being an operation in which the combustion cycle is always performed in some cylinders less than the cylinder number, wherein in the reduced-cylinder operation, all of the cylinders perform a partial operation in which an operating state and a resting state thereof are repeated.

Also, in order to achieve the above object, the present invention provides a method for controlling an internal combustion engine, in which a plurality of fuel injection valves which are configured to respectively inject fuel into cylinders having a cylinder number of two or more and a resting mechanism which is configured to cancel an action of a valve drive mechanism, which is configured to open and close a plurality of intake or exhaust valves so as to allow intake and exhaust to and from the cylinders, to maintain the intake or exhaust valves in a closed state are adjusted, thereby switching between an all-cylinder operation in which a combustion cycle is always performed in all of the cylinders and a reduced-cylinder operation in which the combustion cycle is always performed in some cylinders less than the cylinder number, the method including: causing all of the cylinders to perform a partial operation in which an operating state and a resting state thereof are repeated, during the reduced-cylinder operation.

The partial operation is an operation, in which when focusing on each of the cylinders, the operating state, during which a combustion cycle is performed, and the resting state, during which a combustion cycle is not performed, are repeatedly performed on each of the cylinders. Also, when focusing on an operation state of each of the cylinders during a period of one combustion cycle of one cylinder, one or some of the cylinders are in the resting state and the others are in the operating state.

Further, the operating state is a state where, until a combustion cycle is performed by a predetermined operating number set to less than the cylinder number, fuel is injected by the fuel injection valve and also the intake or exhaust valves are opened and closed by the valve drive mechanism. On the other hand, the resting state is a state where, during a period of time corresponding to one combustion cycle after a combustion cycle has been performed by the operating number, injection of fuel from the fuel injection valves is stopped and also the intake or exhaust valves are maintained in the closed state by the resting mechanism. Further, during the reduced-cylinder operation, a timing of the resting state of each of the cylinders is different between the cylinders and also the resting state occurs sequentially for each of the cylinders.

More specifically, in a 3-cylinder engine, a 2-cylinder operation in which each of the cylinders performs two combustion cycles and then one resting, and a 1.5-cylinder operation in which each of the cylinders performs one combustion cycle and then one resting can be exemplified. Also, in a 4-cylinder engine, a 3-cylinder operation in which each of the cylinders performs three combustion cycles and then one resting, a 2.5-cylinder operation in which each of the cylinders performs two combustion cycles and then one resting, and a 2-cylinder operation in which each of the cylinders performs one combustion cycle and then one resting can be exemplified.

Advantageous Effects of Invention

According to the internal combustion engine and the method for controlling the same, all of the cylinders perform the partial operation during the reduced-cylinder operation. Therefore, it is possible to avoid only a specific cylinder from being maintained in the resting state during a long time, thereby sequentially resting all of the cylinders.

Accordingly, since lubricant oil, which exists inside a combustion chamber of a cylinder in the resting state, is burned during the next operating state, it is possible to avoid a large amount of lubricant oil from gathering inside the combustion chamber, thereby reducing white smoke from occurring upon switching from the reduced-cylinder operation into the all-cylinder operation.

Further, according to the internal combustion engine and the method for controlling the same, it is possible to freely change the number of cylinders, which are in the operating state during a period of one combustion cycle of one cylinder in the reduced-cylinder operation, by extending or shortening a resting interval in the partial operation.

Accordingly, since it is possible to avoid an output range of the internal combustion engine from jumping during the reduced-cylinder operation, it becomes possible to change the number of cylinders in the operating state in accordance with an operation state of the internal combustion engine. Therefore, the reduced-cylinder operation can be performed in various operation states of the internal combustion engine, so that an operation range of the reduced-cylinder operation can be expanded, thereby increasing a fuel efficiency improvement effect by the reduced-cylinder operation.

Further, according to the internal combustion engine and the method for controlling the same, even if an engine has a cylinder number of an odd number, such as a 5-cylinder engine or a 3-cylinder engine, it is possible to perform the reduced-cylinder operation thereon.

MODE FOR CARRYING OUT THE INVENTION

Figure 1:
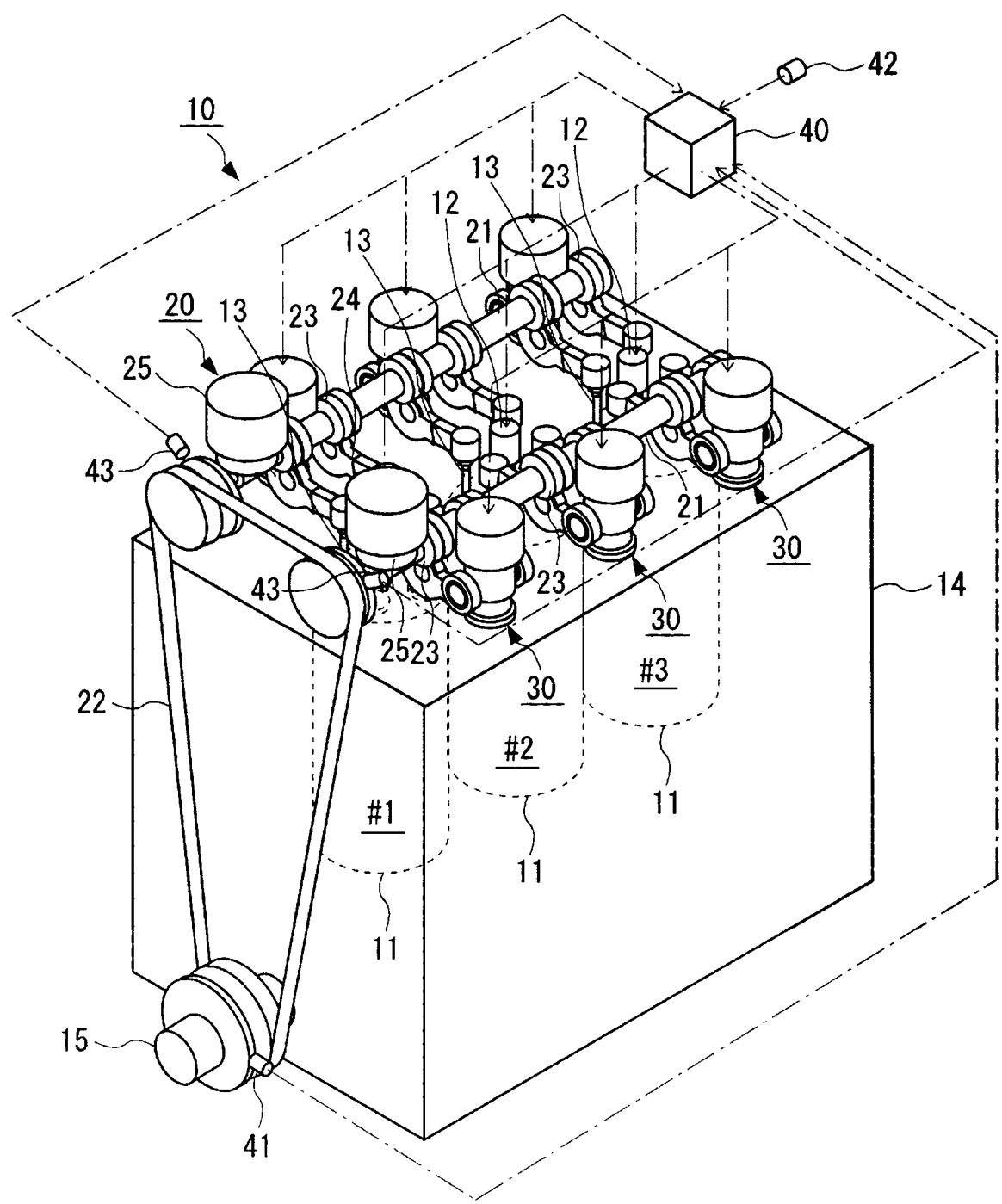
FIG. 1 is a configuration diagram illustrating an engine according to an embodiment of the present invention.

Hereinafter, embodiments of the present invention will be described with reference to the accompanying drawings. FIG. 1 illustrates an engine 10 according to an embodiment of the present invention. The engine 10 is a multi-cylinder engine having cylinders 11 of a predetermined cylinder number Nc (herein, three cylinders) and capable of switching between an all-cylinder operation Oa and a reduced-cylinder operation Or. Meanwhile, in the drawings, the reference numeral #1 refers to a first cylinder, the reference numeral #2 refers to a second cylinder and the reference numeral #3 refers to a third cylinder.

The engine 10 has three cylinders 11, three fuel injection valves 12 arranged in the respective cylinders 11, and four intake or exhaust valves 13 for each cylinder 11 including two valves for intake and two valves for exhaust. Meanwhile, although an in-line 3-cylinder engine having three cylinders arranged in line is illustrated in the present embodiment, the cylinder number Nc, the cylinder arrangement, and the number of intake or exhaust valves 13 per cylinder are not particularly limited. In addition, examples of the cylinder number Nc may include 2 cylinders to 16 cylinders and the like. Also, the cylinder arrangement is not limited to the in-line type, but may include a horizontally opposed type, a V type, a W type and the like. Further, the number of intake or exhaust valves 13 may be one per cylinder for each of intake and exhaust.

The cylinders 11 are arranged in line in a longitudinal direction of a cylinder block 14. The fuel injection valves 12 are an electronically controlled type and are configured to be connected to a common rail (not shown) so that a high pressure fuel is supplied thereto from the common rail. The intake or exhaust valves 13 are configured to be opened and closed by a valve drive mechanism 20 and to be maintained in a closed state when an action of the valve drive mechanism 20 thereon is occasionally canceled by respective resting mechanisms 30.

Figure 2:
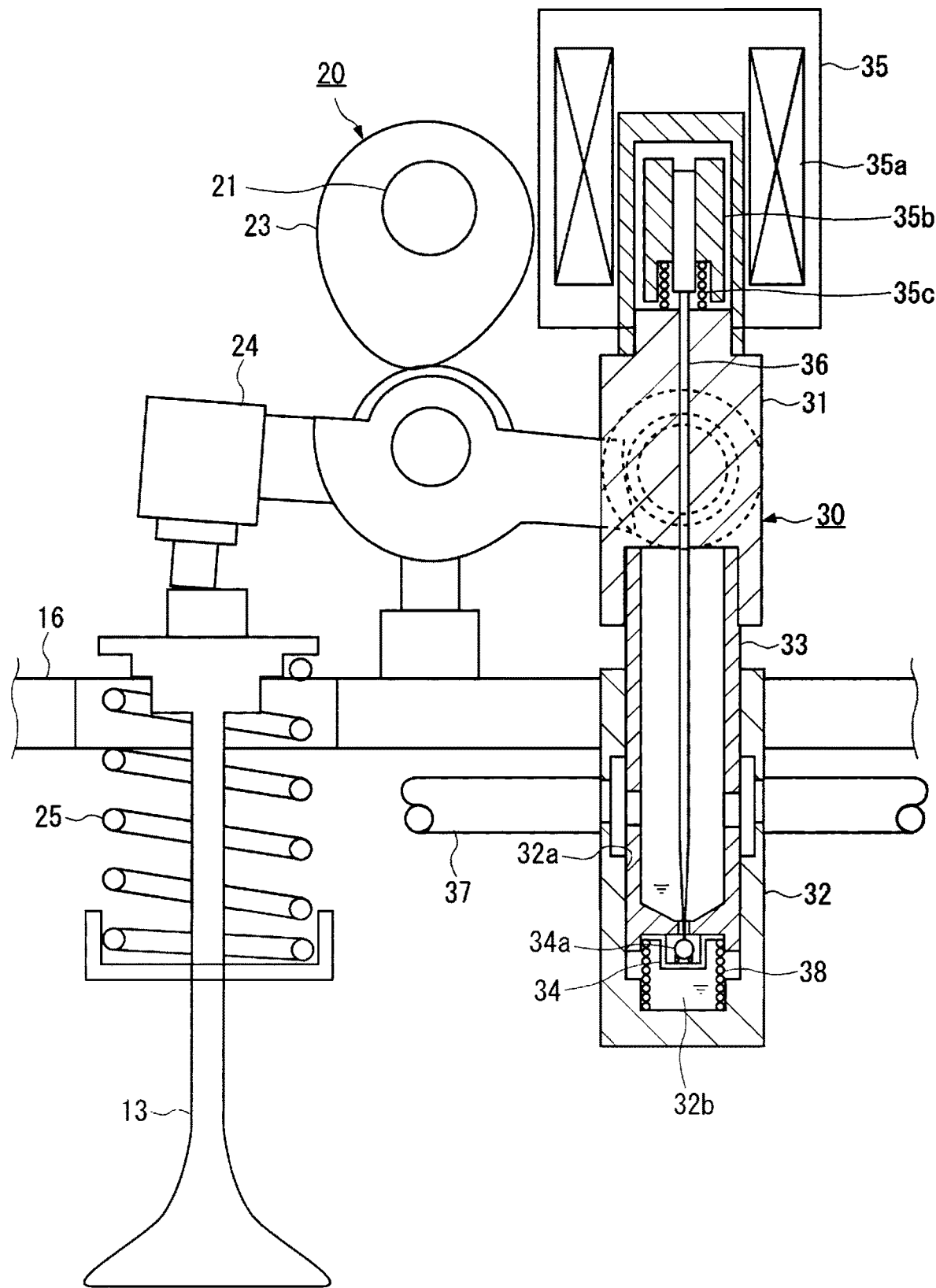
FIG. 2 is a configuration diagram illustrating a valve drive mechanism and a resting mechanism in FIG. 1 in an operating state.
Figure 3:
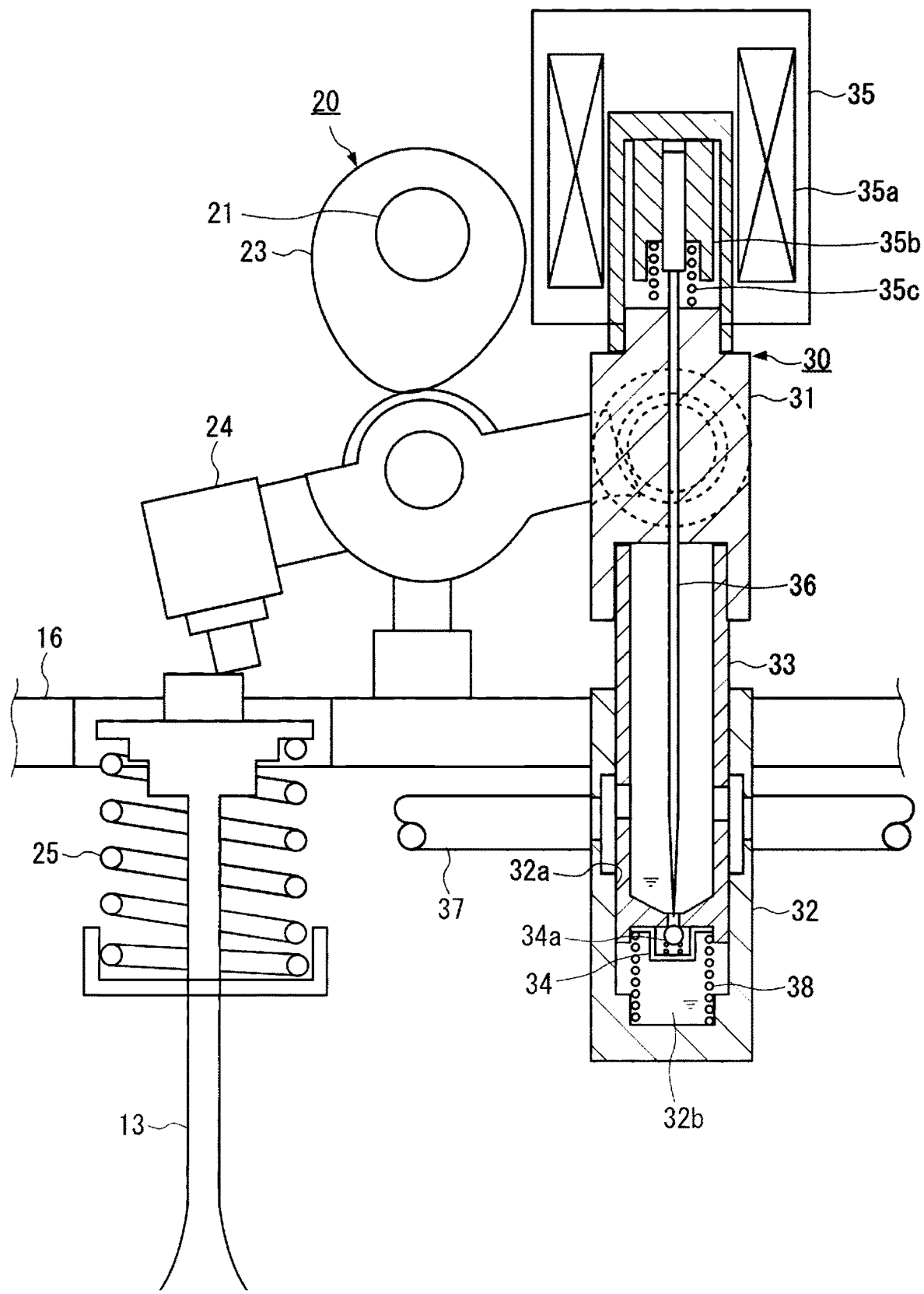
FIG. 3 is a configuration diagram illustrating the valve drive mechanism and the resting mechanism in FIG. 1 in a resting state.

FIGS. 2 and 3 illustrate configurations of the valve drive mechanism 20 and the resting mechanism 30, in which FIG. 2 illustrates a state where the intake or exhaust valves 13 are opened and closed by the valve drive mechanism 20 and FIG. 3 illustrates a state where the intake or exhaust valves 13 are maintained in the closed state by the resting mechanism 30.

The valve drive mechanism 20 has valve springs 26 for urging the intake or exhaust valves 13 to be closed; rocker arms 24 configured to be swingable for opening the intake or exhaust valves 13 against an urging force of the valve springs 26; and cams 23 for swinging the rocker arms 24.

The valve drive mechanism 20 is a Double OverHead Camshaft (DOHC) in which the intake or exhaust valves 13 for intake and the intake or exhaust valves 13 for exhaust are opened and closed by different cam shafts 21. In the valve drive mechanism 20, the cam shafts 21 are rotated by a rotational power transmitted from the crankshaft 15 via a power transmission mechanism 22, such as an endless belt or chain. At this time, when the crankshaft 15 makes two revolutions, the cam shafts 21 make one revolution. Then, as the cam shafts 21 are rotated, oval-shaped cross-sectional cams 23 are rotated, so that the rocker arms 24 are operated in accordance with the principle of lever, thereby opening and closing the intake or exhaust valves 13.

Meanwhile, the valve drive mechanism 20 is not limited to the above configuration, but may have any configuration as far as the intake or exhaust valves 13 can be opened and closed. As the cam mechanism, a Single OverHead Camshaft (SOHC) may be employed, in which all intake or exhaust valves 13 for intake and exhaust are opened and closed by one cam shaft. Further, instead of the cam mechanism, an electronic mechanism, in which intake or exhaust valves 13 are directly opened and closed by an electronic solenoid, may be employed as the valve drive mechanism 20.

The resting mechanism 30 is a mechanism for maintaining intake or exhaust valves 13 of a cylinder 11, in which injection of fuel from the fuel injection valve 12 is stopped, in the closed state, i.e., cancelling an action of the valve drive mechanism 20 thereon. Although the detailed configuration thereof will be described below, the resting mechanism 30 includes a rocker arm bracket 31, a lash adjuster 32, a piston 33, a check valve 34, an electronic solenoid 35, a needle 36 and an oil gallery 39.

In the resting mechanism 30, the needle 36 is driven by the electronic solenoid 35, and hence a check ball 34a is pushed down by a distal end of the needle 26, thereby opening a hydraulic pressure chamber 32b in the lash adjuster 32. As a result, an action, which would otherwise have been transferred from the cams 23 to the intake or exhaust valves 13 via the rocker arms 24, is avoided, thereby maintaining the intake or exhaust valves 13 in the closed state. Meanwhile, if the valve drive mechanism 20 is an electronic mechanism, the valve drive mechanism 20 may replace the function of the resting mechanism 30.

According to the present invention, as shown in FIG. 1, the engine 10 has a control device 40 for adjusting the fuel injection valves 12 and the resting mechanisms 30 to control switching between an all-cylinder operation Oa, in which combustion cycle is always performed in all cylinders 11, and a reduced-cylinder operation Or, in which combustion cycle is always performed in some cylinders 11 which is less than the cylinder number Nc. Also, for the reduced-cylinder operation, the control device 40 is configured to execute a control of causing all cylinders 11 to perform a partial operation, in which an operating state and a resting state thereof are repeated.

That is, the control device 40 is configured to execute a control of repeating an operating state and a resting state on all cylinders 11 during a period of the reduced-cylinder operation Or. Also, when focusing on an operation state of each of the cylinders during a period of one combustion cycle of one cylinder, one or some of the cylinders are in the resting state and the others are in the operating state.

The control device 40 is configured by a CPU for executing various processes, an internal storage device which allows reading/writing of programs, which are used to execute the various processes, or process results, various interfaces and the like. The control device 40 is connected to the fuel injection valve 12, a hydraulic actuator 25 of the valve drive mechanism 20 and the resting mechanism 30, and also to sensors, such as an engine revolution number sensor 41, an accelerator opening degree sensor 42 and a cam angle sensor (top dead center sensor) 43 as a detection device, via signal lines. Also, examples of execution programs stored in the internal storage device of the control device 40 include a switching control program as described below in a flow chart.

The cam angle sensor 43 is provided on each of an intake camshaft 21 and an exhaust camshaft 21. The cam angle sensor 43 is configured to detect a bottom dead center and a top dead center of each of the cylinders 11, i.e., timings, at which the intake or exhaust valves 13 are opened and then closed again, every one revolution of the camshafts 21. Specifically, the cam angle sensor 43 for intake is configured to detect a bottom dead center after an intake stroke. The cam angle sensor 43 for exhaust is configured to detect a top dead center after an exhaust stroke.

Also, the cam angle sensor 43 is configured to identify the first cylinder #1 and then to detect the bottom dead center and the top dead center of each of the second cylinder #2 and the third cylinder #3 on the basis of the first cylinder #1.

Figure 4:
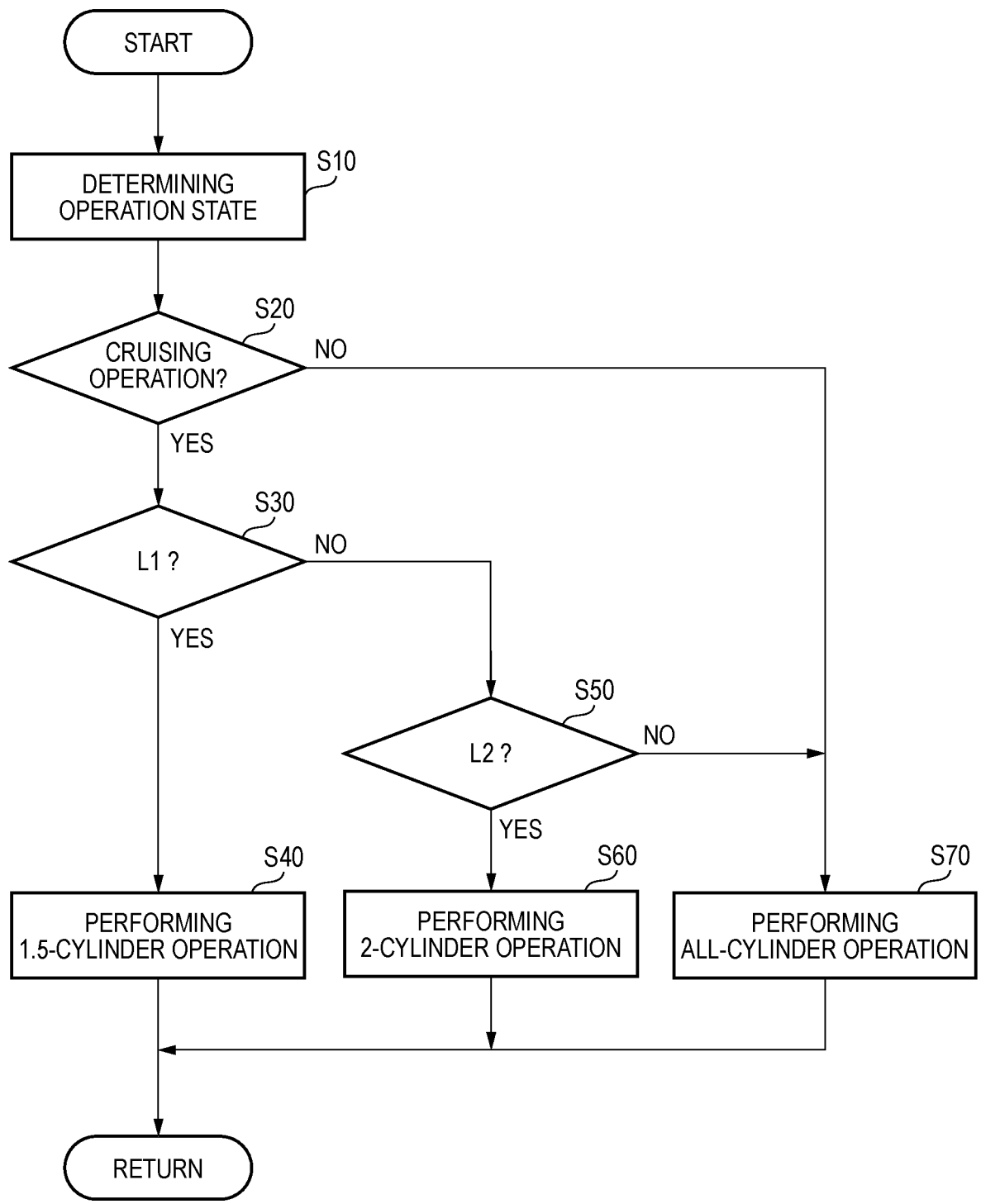
FIG. 4 is a flowchart illustrating a control method of the engine according to an embodiment of the present invention.

Next, a control method of the engine 10 as functions of the control device 40 will be described below with reference to a flowchart of FIG. 4. Meanwhile, the control method is started if the engine 10 is started and is ended if the engine 10 is stopped. Further, in the following, as the reduced-cylinder operation Or of the 3-cylinder engine, the reference numeral Or2 refers to a 2-cylinder operation and the reference numeral Or1 refers to a 1.5-cylinder operation.

First, in a step S10, the control device 40 determines an operation state of the engine 10. In the step S10, the control device 40 preferably determines an operation state of the engine 10 on the basis of detection values of the engine revolution number sensor 41 and the accelerator opening degree sensor 42.

Specifically, the control device 40 receives a request of a driver from an accelerator opening degree and then determines an optimal operation state from rotation and output torque of the engine at that time. Further, in order to execute a stable control, the control device 40 may correct the operation state by water temperature and intake air temperature.

Figure 5:
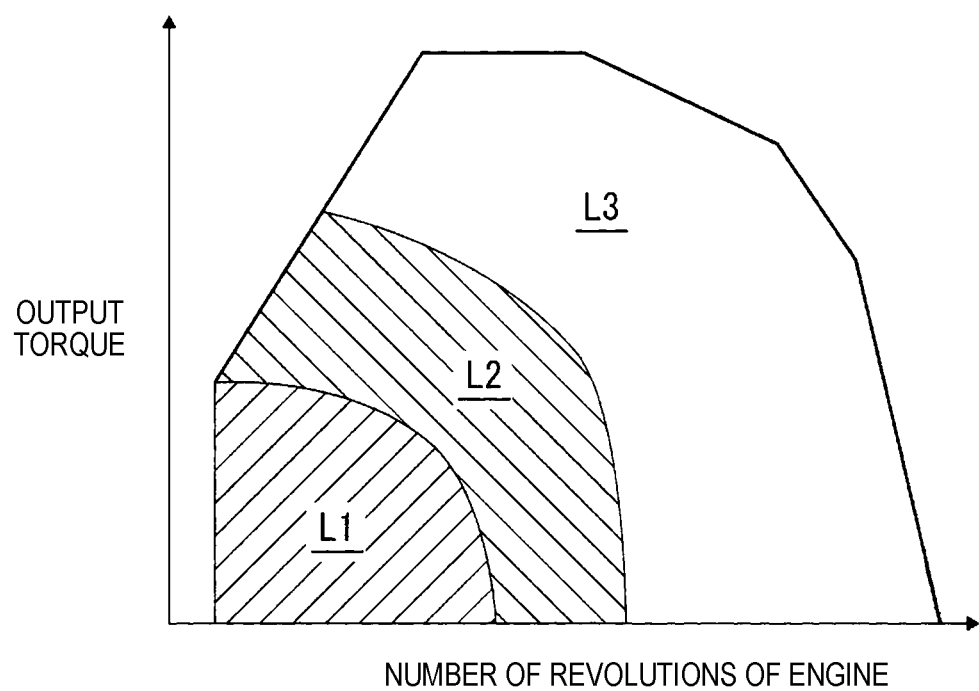
FIG. 5 is a performance characteristic diagram of the engine in FIG. 1.

FIG. 5 shows performance characteristics of the engine 10 on the basis of an engine revolution number and an output torque. The performance characteristic diagram of the engine 10 is previously prepared by experiments or tests and then stored in the internal storage device of the control device 40. The operation state of the engine 10 is determined on the basis of the accelerator opening degree and the performance characteristic diagram.

Examples of the operation state of the engine 10 include any one of a low load L1, in which the engine revolution number is low and the output torque is low, a high load L3, in which the engine revolution number is high and the output torque is high, and a medium load L2, which is between these ranges. Meanwhile, although three loads including from the low load L1 to the high load L3 are distinguished in the 3-cylinder engine, it should be noted that the larger the cylinder number Nc, such as a 4-cylinder engine or a 6-cylinder engine, the larger the number of loads.

Further, in addition to the load, a rate of change in the accelerator opening degree is preferably employed as a parameter indicating the operation state of the engine 10. The rate of change in the accelerator opening degree is represented by a change amount of detection value of the accelerator opening degree sensor 42 per unit time or per unit travelling distance.

Subsequently, in a step S20, the control device 40 determines whether or not the operation state of the engine 10 is a cruising state. In the step S20, if the rate of change in the accelerator opening degree is lower than a preset threshold value, it is determined that the operation state is the cruising state, whereas if the rate of change is equal to or greater than the threshold value, it is determined that the operation state is not the cruising state. An example of the cruising state include a case where a vehicle with the engine 10 mounted thereon is travelling on an expressway or the like. If in the step S20, it is determined that the operation state of the engine 10 is the cruising state, the process proceeds to a step S30. On the other hand, if it is determined that the operation state is not the cruising state, the process proceeds to a step S70.

Further, in another example of the step S20, a rate of change in a vehicle speed, presence or absence of an auto cruise mode or the like may be employed.

Subsequently, in a step S30, the control device 40 determines whether or not the operation state of the engine 10 is the low load L1. If in the step S30, it is determined that the operation state of the engine 10 is the low load L1, the process proceeds to a step S40. On the other hand, if it is determined that the operation state is not the low load L1, the process proceeds to a step S50.

Figure 6A:
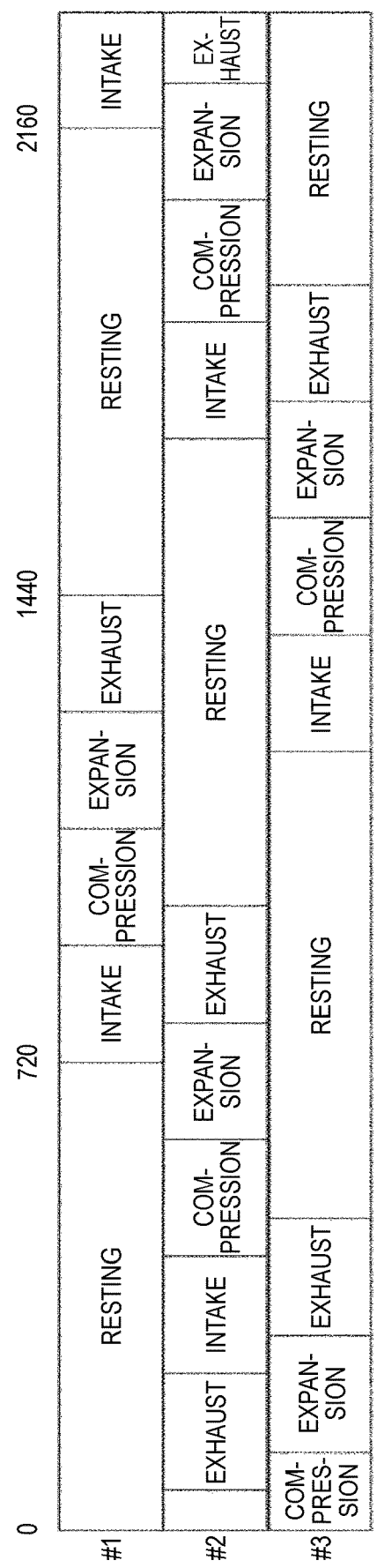
FIG. 6A is an explanatory diagram illustrating combustion cycles and resting of each cylinder during a reduced-cylinder operation of the engine in FIG. 1, particularly an explanatory diagram illustrating combustion cycles and resting of each cylinder during a 1.5-cylinder operation of a 3-cylinder engine.
Figure 6B:
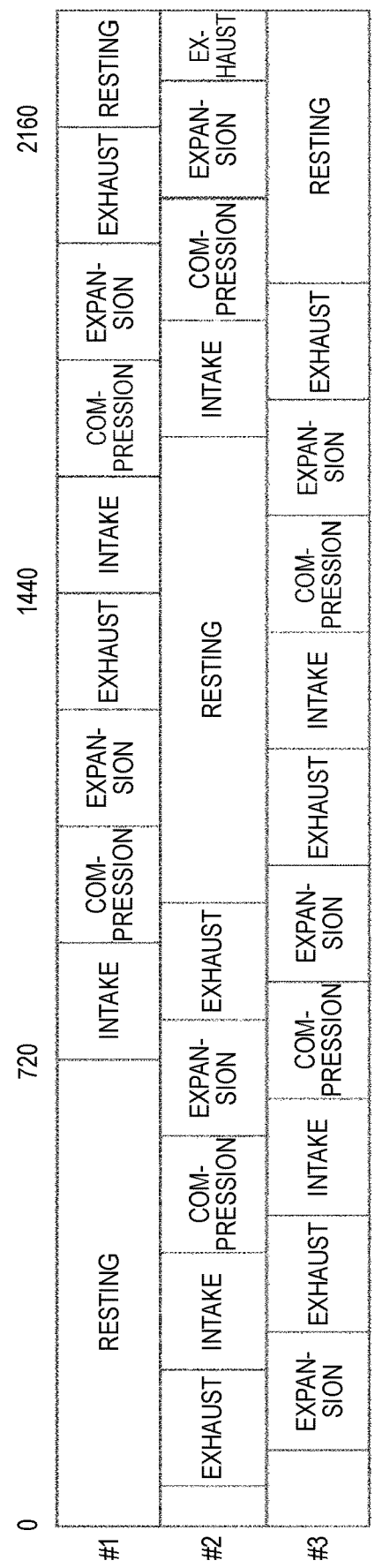
FIG. 6B is an explanatory diagram illustrating combustion cycles and resting of each cylinder during the reduced-cylinder operation of the engine in FIG. 1, particularly an explanatory diagram illustrating combustion cycles and resting of each cylinder during a 2-cylinder operation of the 3-cylinder engine.

FIG. 6A is an explanatory diagram illustrating combustion cycles and resting of each cylinder during a 1.5-cylinder operation Or1 of the 3-cylinder engine, and FIG. 6B is an explanatory diagram illustrating combustion cycles and resting of each cylinder during a 2-cylinder operation Or2.

Subsequently, in the step S40, the control device 40 performs the 1.5-cylinder operation Or1 on all of the cylinders 11. As shown in FIG. 6A, the 1.5-cylinder operation Or1 is a reduced-cylinder operation, in which each of the cylinders 11 performs one combustion cycle and then one resting. If the step S40 is completed, the process returns to the start thereof.

Subsequently, in the step S50, the control device 40 determines whether or not the operation state of the engine 10 is the medium load L2. If in the step S50, it is determined that the operation state of the engine 10 is the medium load L2, the process proceeds to a step S60. On the other hand, if it is determined that the operation state is not the medium load L2, i.e., the high load L3, the process proceeds to the step S70.

Subsequently, in the step S60, the control device 40 performs the 2-cylinder operation Or2 on all of the cylinders 11. As shown in FIG. 6B, the 2-cylinder operation Or2 is a reduced-cylinder operation, in which each of the cylinders 11 performs two combustion cycles and then one resting. If the step S60 is completed, the process returns to the start thereof.

Meanwhile, in the step S70, the control device 40 performs the all-cylinder operation Oa on all of the cylinders 11. The all-cylinder operation Oa is an operation, in which a combustion cycle is always performed in all of the cylinders 11. If the step S70 is completed, the process returns to the start thereof.

In this control method, for example, when depression of an accelerator pedal is large, this is an acceleration state and hence the all-cylinder operation Oa is performed in order to prioritize an output torque over a fuel efficiency. On the other hand, in the cursing operation, in which a rate of change in the accelerator pedal is small, the fuel efficiency is prioritized, and hence it is determined which reduced-cylinder operation Or is optimal to an engine revolution number and an output torque in that state, and then operation of the engine is switched thereto. For this switching, it is preferable to determine a fuel supply amount so that an output torque immediately before switching and an output torque immediately after switching are equal to each other. Since fuel consumption rates at the switching point are the same, an injection amount of fuel to be supplied to each of the cylinders 11 is determined in such a manner that the total injection amount of fuel is not changed.

Herein, the reduced-cylinder operation Or will be described in detail. As shown in FIGS. 6A and 6B, the reduced-cylinder operation Or is a partial operation, in which all of the cylinders 11 repeat an operating state and a resting state and hence the number of cylinders 11, which are performing a combustion cycle, is always less than the cylinder number Nc.

More specifically, the partial operation is an operation, in which when focusing on each of the cylinders 11 (e.g., first cylinder #1), the operating state, during which a combustion cycle is performed, and the resting state, during which a combustion cycle is not performed, are repeatedly performed on the first cylinder #1. Also, if focusing on operation states of the second cylinder #2 and the third cylinder #3 during a period of one combustion cycle of the first cylinder #1, one or some of the cylinders 11 are in the resting state and the others are in the operating state.

The operating state is a state where, until a combustion cycle of a cylinder 11 is continuously performed by a predetermined operating number Na set to less than the cylinder number Nc, fuel is injected by the fuel injection valve 12 thereof and also the intake or exhaust valves 13 thereof are opened and closed by the valve drive mechanism 20. That is, in a cylinder 11 which is in the operating state, intake, compression, expansion (combustion) and exhaust strokes as a combustion cycle are performed in this order.

The resting state is a state where, after a combustion cycle of a cylinder 11 has been performed by the operating number Na, injection of fuel from the fuel injection valve 12 thereof is stopped and also the intake or exhaust valves 13 thereof are maintained in the closed state by the resting mechanism 30 during a period of time corresponding to one combustion cycle thereof. That is, in a cylinder 11 which is in the resting state, the combustion cycle is not performed.

Further, in the reduced-cylinder operation Or, a timing of the resting state of each of the cylinders 11 during the partial operation is different between the cylinders 11, and also the resting state sequentially occurs for each of the cylinders 11.

The operating number Na in the operating state is set to less than the cylinder number Nc, and in the present embodiment, set to less than 3, i.e., to 2 and 1. In addition, for example, for an 8-cylinder engine, the operating number Na is set to 7 to 1. For a 6-cylinder engine, the operating number Na is set to 5 to 1. Also, for a 4-cylinder engine, the operating number Na is set to 3 to 1.

In this way, by allowing the operating number Na to be varied, the reduced-cylinder operation Or is enabled without being limited by the cylinder number Nc or cylinder arrangement of the engine 10. Therefore, even if the cylinder number is an odd number, such as a 5-cylinder engine or a 3-cylinder engine, the reduced-cylinder operation Or can be performed.

Further, by allowing the operating number Na to be varied, an interval of the resting state of each of the cylinders 11 can be freely be extended or shortened. Thus, when paying attention to a period of one combustion cycle of one cylinder 11 in the reduced-cylinder operation Or, the numbers of cylinders, which are in the operating state during the period, can be freely adjusted.

Specifically referring to FIGS. 6A and 6B, the operating number Na for the partial operation in the 1.5-cylinder operation Or1 is set to 1. Also, in the 1.5-cylinder operation Or1, the resting state occurs in the order of the first cylinder #1, the third cylinder #3 and the second cylinder #2. On the other hand, the operating number Na for the partial operation in the 2-cylinder operation Or2 is set to 2. Also, in the 2-cylinder operation Or2, the resting state occurs in the order of the first cylinder #1, the second cylinder #2 and the third cylinder #3.

Figure 7:
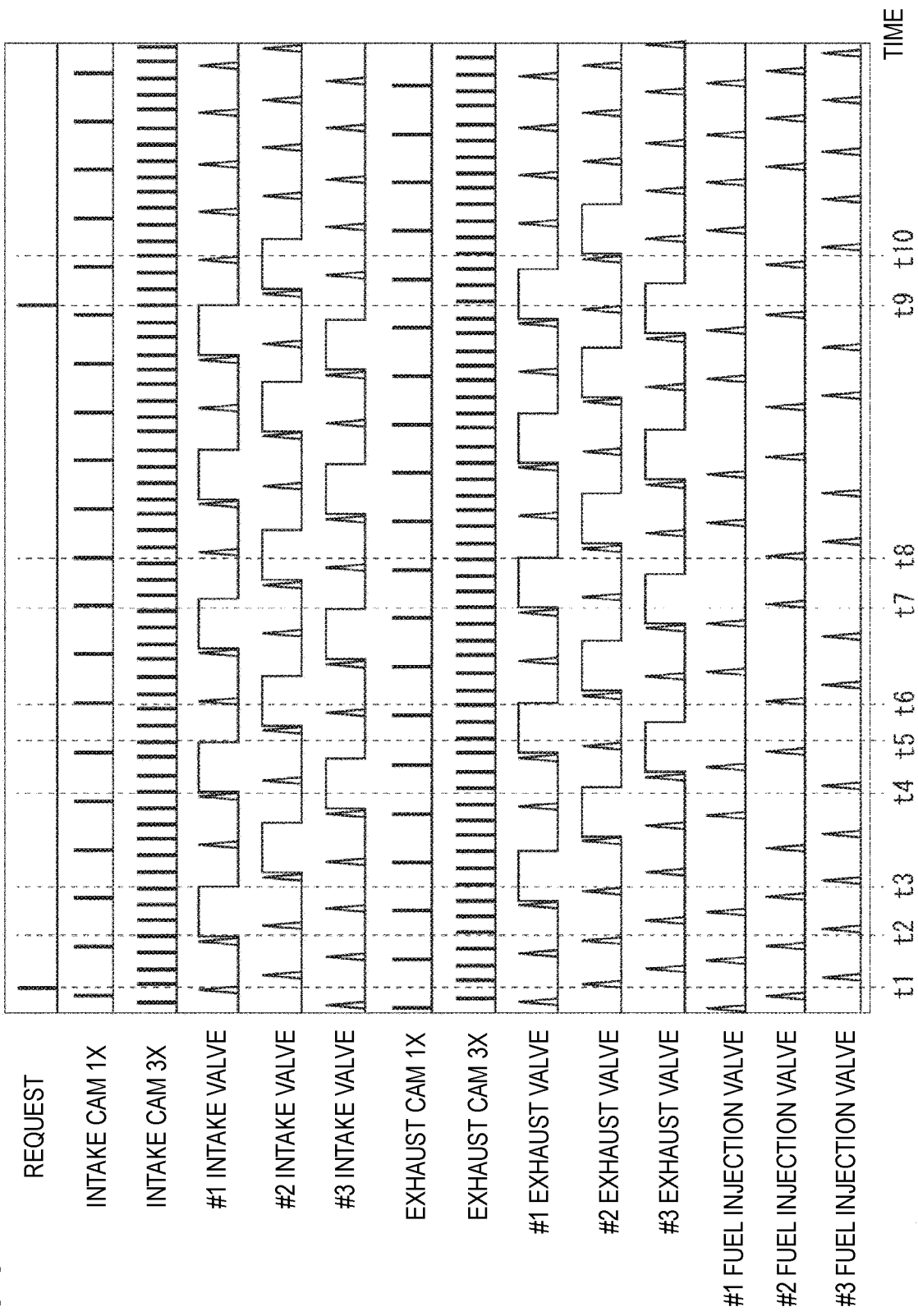
FIG. 7 is an explanatory diagram illustrating operation situations of a fuel injection valve and intake or exhaust valves during the 1.5-cylinder operation in the 3-cylinder engine.
Figure 8:
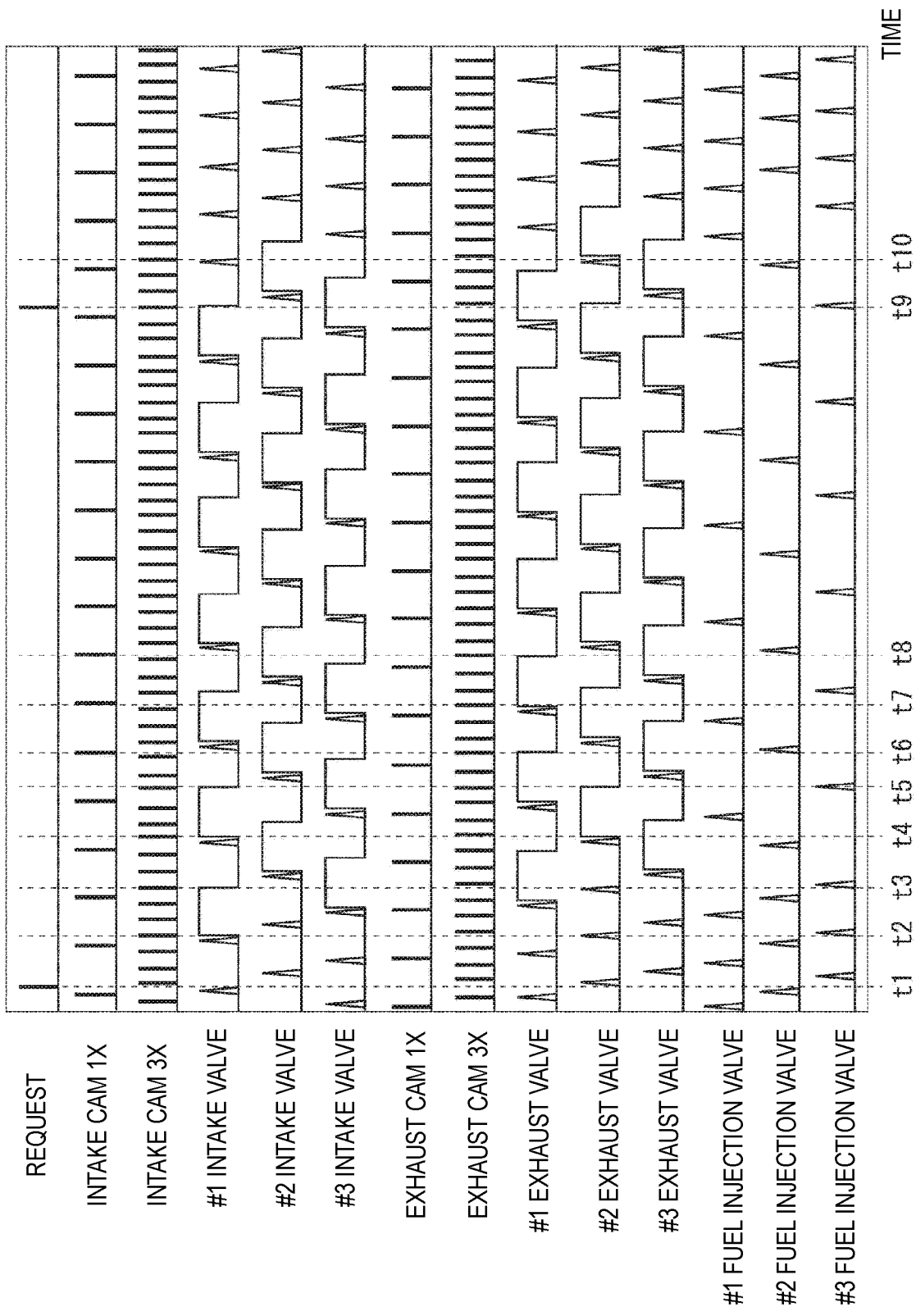
FIG. 8 is an explanatory diagram illustrating operation situations of the fuel injection valve and the intake or exhaust valves during the 2-cylinder operation in the 3-cylinder engine.

FIGS. 7 and 8 show operation situations of the fuel injection valve 12 and the intake or exhaust valves 13 in the reduced-cylinder operation Or, in which FIG. 7 shows a situation in the 1.5-cylinder operation Or1 and FIG. 8 shows a situation in the 2-cylinder operation Or2. In the figures, the remark "Request" represents a request for execution of the control device 40; the remark "Intake Cam 1X" represents identifying of the first cylinder #1; the remark "Exhaust Cam 3X" represents a bottom dead center of each of the cylinder 11 after an intake stroke; the remark "#1 Intake Valve" represents an opening and closing situation of an intake or exhaust valve 13 for intake in the first cylinder #1 and an operation situation of each of the resting mechanisms 30; the remark "Exhaust Cam 1X" represents identifying of the first cylinder #1; the remark "Exhaust Cam 3X" represents a top dead center of each of the cylinder 11 after an exhaust stroke; and the remark "#1 Fuel Injection Valve" represents an fuel injection situation of the fuel injection valve 12 of the first cylinder #1. Also, in the remark "#1 Intake Valve", a triangular wave represents the opening and closing situation of the intake or exhaust valve 13 and a rectangular wave represents a resting signal from the control device 40.

The control device 40 is configured to control the resting state of each of the cylinders 11 during the reduced-cylinder operation Or by monitoring a detection value of the cam angle sensor 43 as a detection device.

If a request for execution of the step S40 occurs at a time t1, the 1.5-cylinder operation Or1 is started from a time t2, which represents a bottom dead center of the first cylinder #1 after an intake stroke thereof is performed from the time t1. Then, in the 1.5-cylinder operation Or1, the resting state occurs in the order of the first cylinder #1, the third cylinder #3 and the second cylinder #2. On the other hand, in the 2-cylinder operation Or2, the resting state occurs in the order of the first cylinder #1, the second cylinder #2 and the third cylinder #3. Then, if a request for execution of the step S70 occurs at a time t9, the partial operation of the first cylinder #1 is ended from a time t10, which represents a bottom dead center of the first cylinder #1 after an intake stroke thereof is performed from the time t9, and thus the all-cylinder operation Oa is started.

Upon end of the partial operation, the all-cylinder operation Oa is stated after the resting state of all of cylinders 11, which are in the resting state at the time t9, is completed. That is, stop of injection of fuel and maintaining of the closed state of the intake or exhaust valves 13 in one cylinder 11 are ended as a set.

In this way, switching from the all-cylinder operation Oa into the reduced-cylinder operation Or or from the reduced-cylinder operation Or to the all-cylinder operation Oa is started from a bottom dead center after an intake stroke in the operating state, thereby avoiding the cylinders 11 from being switched from the middle of the operating state into the resting state or from the middle of the resting state into the operating state. That is, since switching during opening or closing of the intake or exhaust valves 13 or in the middle of a combustion cycle is avoided, it is possible to avoid output of the engine 10 or discharging of an exhaust gas therefrom from becoming unstable upon switching from the all-cylinder operation Oa into the reduced-cylinder operation Or or from the reduced-cylinder operation Or to the all-cylinder operation Oa In the operating state of a cylinder 11, the intake or exhaust valve 13 for intake is opened at an intake stroke, fuel from the fuel injection valve 12 is injected at an expansion stroke, and the intake or exhaust valve 13 for exhaust is opened at an exhaust stroke. On the other hand, in the resting state, the intake or exhaust valve 13 for intake is maintained in a closed state at a timing of the intake stroke in the operating state, injection of fuel from the fuel injection valve 12 is stopped at a timing of the expansion stroke in the operating state, and the intake or exhaust valve 13 is maintained in a closed state at a timing of the exhaust stroke in the operating state.

The 1.5-cylinder operation Or1 will be described in detail with reference to FIG. 7.

The resting mechanism 30 of the intake or exhaust valve 13 for intake is inactivated from a time t3 to a time t4, at which one combustion cycle is completed, thereby maintaining the intake or exhaust valve 13 for intake in an openable and closable state without canceling an action of the valve drive mechanism 20. Then, the resting mechanism 30 is activated from the time t4 to a time t5, at which one combustion cycle is competed, thereby canceling an action of the valve drive mechanism 20 and thus maintaining the intake or exhaust valve 13 for intake in a closed state. Herein, the times t3 and t4 represent a bottom dead center after an intake stroke in the operating state of the cylinder 11, and the time t5 represents a bottom dead center after an intake stroke in the resting state of the cylinder 11 after passing through a bottom dead center after an expansion stroke in the operating state. That is, when the cylinder 11 is switched from the operating state into the resting state, the intake or exhaust valve 13 for intake is maintained in the closed state until a second bottom dead center (time t5), as counted from the bottom dead center (time t4) after the intake stroke in the operating state.

The resting mechanism 30 of the intake or exhaust valve 13 for exhaust is inactivated from a time t6 to a time t7, at which one combustion cycle is completed, thereby maintaining the intake or exhaust valve 13 for exhaust in an openable and closable state without canceling an action of the valve drive mechanism 20. Then, the resting mechanism 30 is activated from the time t7 to a time t8, at which one combustion cycle is competed, thereby canceling an action of the valve drive mechanism 20 and thus maintaining the intake or exhaust valve 13 for exhaust in a closed state. Herein, the times t6 and t7 represent a top dead center after an exhaust stroke in the operating state of the cylinder 11, and the time t8 represents a top dead center after an exhaust stroke in the resting state of the cylinder 11 after passing through a top dead center after a compression stroke in the operating state. That is, when the cylinder 11 is switched from the operating state into the resting state, the intake or exhaust valve 13 for exhaust is maintained in the closed state until a second top dead center (time t8), as counted from the top dead center (time t7) after the exhaust stroke in the operating state.

In the fuel injection valve 12, injection of fuel is stopped during a period of time from the time t5 to the time t6. That is, injection of fuel from the fuel injection valve 12 is stopped during a period of time from the second bottom dead center (time t5), as counted from the bottom dead center after the intake stroke in the operating state, until the second top dead center (time t8), as counted from the top dead center after the exhaust stroke in the operating state.

The 2-cylinder operation Or2 will be described in detail with reference to FIG. 8.

The resting mechanism 30 of the intake or exhaust valve 13 for intake is inactivated from a time t3 to a time t4, at which two combustion cycles are completed, thereby maintaining the intake or exhaust valve 13 for intake in an openable and closable state without canceling an action of the valve drive mechanism 20. Then, the resting mechanism 30 is activated from the time t4 to a time t5, at which one combustion cycle is competed, thereby canceling an action of the valve drive mechanism 20 and thus maintaining the intake or exhaust valve 13 for intake in a closed state. That is, when the cylinder 11 is switched from the operating state into the resting state, the intake or exhaust valve 13 for intake is maintained in the closed state until a second bottom dead center (time t5), as counted from the bottom dead center (time t4) after the intake stroke in the operating state.

The resting mechanism 30 of the intake or exhaust valve 13 for exhaust is inactivated from a time t6 to a time t7, at which two combustion cycles are completed, thereby maintaining the intake or exhaust valve 13 for exhaust in an openable and closable state without canceling an action of the valve drive mechanism 20. Then, the resting mechanism 30 is activated from the time t7 to a time t8, at which one combustion cycle is completed, thereby canceling an action of the valve drive mechanism 20 and thus maintaining the intake or exhaust valve 13 for exhaust in a closed state. That is, when the cylinder 11 is switched from the operating state into the resting state, the intake or exhaust valve 13 for exhaust is maintained in the closed state until a second top dead center (time t8), as counted from the top dead center (time t7) after the exhaust stroke in the operating state.

In the fuel injection valve 12, injection of fuel is stopped during a period of time from the time t5 to the time t6. That is, injection of fuel from the fuel injection valve 12 is stopped during a period of time from the second bottom dead center (time t5), as counted from the bottom dead center after the intake stroke in the operating state, to the second top dead center (time t8), as counted from the top dead center after the exhaust stroke in the operating state.

As described above, when the cylinder 11 is switched from the operating state into the resting state, it is preferable to maintain the intake or exhaust valve 13 for intake in the closed state until the second bottom dead center, as counted from the bottom dead center after the intake stroke in the operating state and also to maintain the intake or exhaust valve 13 for exhaust in the closed state until the second top dead center, as counted from the top dead center after the exhaust stroke in the operating state by means of the respective resting mechanisms 30.

That is, a resting operation can be started at a timing, at which the intake or exhaust valves 13 are closed and then the resting operation can be ended before a timing, at which the intake or exhaust valves 13 are opened, thereby avoiding the resting operation from being performed during opening or closing of the intake or exhaust valves 13. Therefore, it is possible to avoid the resting operation from causing a seating sound of the intake or exhaust valves 13 to occur or causing the intake or exhaust valves 13 to be damaged.

Since the controls as described above are executed, it is possible to avoid only a specific cylinder 11 from being maintained in the resting state during a long time, thereby sequentially resting all of the cylinders 11. Therefore, since lubricant oil, which exists inside a combustion chamber of a cylinder 11 in the resting state, is burned during the next operating state, it is possible to avoid a large amount of lubricant oil from gathering inside the combustion chamber, thereby reducing white smoke from occurring upon switching from the reduced-cylinder operation Or into the all-cylinder operation Oa.

Also, it is possible to freely change the number of cylinders 11, which are in the operating state during the reduced-cylinder operation Or, by extending or shortening a resting interval in the partial operation during the reduced-cylinder operation Or, namely switching between the 1.5-cylinder operation Or1 and the 2-cylinder operation Or2 in the above example. Therefore, it is possible to smoothly change an output range of the engine 10 during the reduced-cylinder operation Or without being discontinuous, thereby expanding an operation range of the reduced-cylinder operation Or.

The number of cylinders 11 in the operating state and the output range have a positive correlation therebetween. For example, if a reduced-cylinder operation of an 8-cylinder engine can be sequentially switched between a 7-cylinder operation and a 2-cylinder operation, the output range can be smoothly changed from 100%, which is a case of an 8-cylinder operation, to 87%, to 75%, to 62%, to 50%, to 37%, and then to 25%. On the contrary, in the case of the related art, in which a specific cylinder is maintained in the resting state, three operations including an 8-cylinder operation, a 6-cylinder operation and a 4-cylinder operation are performed, and hence an output range is rapidly changed from 100 to 75% and then to 50%.

That is, since the number of cylinders 11 in the operating state during the reduced-cylinder operation Or can be freely changed, it is possible to avoid an output range from being jumped, thereby changing the number of cylinders in the operating state in accordance with an operation state of the engine 10. Therefore, the reduced-cylinder operation Or can be performed in various operation states of the engine 10, so that an operation range of the reduced-cylinder operation Or can be expanded, thereby increasing a fuel efficiency improvement effect by the reduced-cylinder operation Or.

Additionally, in the case of the related art, in which only a specific cylinder is maintained in the resting state, there is a risk that booming noise in a vehicle cabin or resonance of seats or a floor becomes worse by vibration due to unequal-interval combustion or cylinder balance. On the contrary, by partially operating all cylinders 11, not fixed cylinders, a vibration source is continuously changed and hence amplification of amplitude due to resonance can be reduced, thereby enhancing a fuel efficiency without significantly impairing comfortability.

Also, even if the engine 10 has a cylinder number Nc of an odd number such as a 5-cylinder engine or a 3-cylinder engine, in which a reduced-cylinder operation was not possible by the technique of the related art in which only a specific cylinder is maintained in the resting state, it is possible to perform a reduced-cylinder operation Or thereon.

As described above, the resting mechanism 30 is not particularly limited as long as it is a mechanism which can cancel an action of the valve drive mechanism 20 to maintain the corresponding intake or exhaust valve 13 in the closed state, but a mechanism having a fast response is preferable. For example, if a 3-cylinder engine rotates at 2500 rpm, one intake or exhaust valve is driven every 720° A (ATDC). That is, a period of time required until the intake or exhaust valve is closed and then opened again is about a half thereof, and thus the operation has to be completed within about 360° A, i.e., about 50 msec.

Thus, as the resting mechanism 30 realizing a fast response to a signal from the control device 40, a configuration shown in FIGS. 2 and 3 is preferable.

The resting mechanism 30 includes a rocker arm bracket 31, a lash adjuster 32, a piston 33, a check valve 34, an electronic solenoid 35, a needle 36 and an oil gallery 39.

The rocker arm bracket 31 is configured to be pin-connected to one end portion of a rocker arm 24 to be vertically movable by swing of the rocker arm 24. The lash adjuster 32 has a cylinder 32a and also is provided with a hydraulic pressure chamber 32b for supplying a hydraulic pressure into the cylinder 32a so that the other end proton of the rocker arm 24 is always in contact with a corresponding intake or exhaust valve 13. The piston 33 includes a hydraulic pressure chamber 33a capable of being communicated with the hydraulic pressure chamber 32b via the check valve 34 and also has an upper end portion fixed to a lower portion of the rocker arm bracket 31 and a lower end portion slidably inserted in the cylinder 32a. The check valve 34 is provided on the lower portion of the piston 33 and has a check ball 34a for opening the hydraulic pressure chamber 32b. The electronic solenoid 35 has an electronic coil 35a and a plunger 35b operated by the electronic coil 35a, and the electronic coil 35a is connected to the control device 40. The needle 36 is provided on the plunger 35b and extends through the rocker arm bracket 31 and the camber of the piston 33 so that a distal end portion thereof can push down the check ball 34a to open the hydraulic pressure chamber 32b. A hydraulic fluid is supplied from the oil gallery 39 to the hydraulic pressure chamber 32b and the hydraulic pressure chamber 33a.

In the resting mechanism 30, if a resting signal form the control device 40 is stopped as shown in FIG. 2, the plunger 35b is returned to an original position thereof and hence the needle 36 is moved upward. Due to this movement of the needle 36, the check ball 34a is urged by a spring, thereby blocking communication between the hydraulic pressure chamber 32b and the hydraulic pressure chamber 33a. Due to blocking of communication, a hydraulic pressure in the hydraulic pressure chamber 32b is increased and also the piston 33 is urged upward by a spring 38, so that movement of the piston 33 is restricted. Therefore, the one end portion of the rocker arm 23 on which an action of the cam 23 has been exerted is fixed, and the rocker arm 24 is swung by the action of the cam 23 so that the other end portion of the rocker arm 24 is moved downward, thereby opening the intake or exhaust valve 13.

On the other hand, as shown in FIG. 3, a magnetic force occurs in the electronic coil 35a due to the resting signal from the control device 40, and hence the plunger 35b is moved downward by the magnetic force so that the needle 36 is moved downward. Due to this movement of the needle 36, the check ball 34a is pushed down, so that the hydraulic pressure chamber 32b of the lash adjuster 32 and the hydraulic pressure chamber 33a of the piston 33 are communicated with each other. Due to this communication, a hydraulic pressure in the hydraulic pressure chamber 32b is decreased, thereby allowing a vertical movement of the piston 33. Since a vertical movement of the rocker arm bracket 31 is also allowed together with the vertical movement of the piston 33, the one end portion of the rocker arm 24 on which an action of the cam 23 has been exerted can be moved downward. Therefore, an action of the valve drive mechanism 20 is canceled and hence the intake or exhaust valve 13 is maintained in a closed state.

Since the resting mechanism 30 is configured as described above, the resting mechanism 30 can fast respond to the resting signal of the control device 40. Therefore, even if the number of revolutions of the engine is high, i.e., the number of revolutions of the cam shaft 21 is high, the cylinders 11 can be smoothly switched between the operating state and the resting state, thereby having an advantage in controlling the reduced-cylinder operation Or of the 3-cylinder engine as in the present embodiment.

Also, the valve drive mechanism 20 is preferably configured such that the cam shaft 21 has two types of cams 23 having different cam profiles. Examples of the cam profiles include a cam profile used for the all-cylinder operation Oa, and a delayed cam profile, which is used for the reduced-cylinder operation Or and has extended opening and closing times of the intake or exhaust valves 13 as compared with the all-cylinder operation Oa.

The two types of cams 23 having different cam profiles are selectively switched by axially sliding the cam shaft 21 by means of a hydraulic actuator 25, which is operated by a control signal of the control device 40.

In this way, the cam profiles can be switched by the valve drive mechanism 20 upon switching between the all-cylinder operation Oa and the reduced-cylinder operation Or. Therefore, during the reduced-cylinder operation Or, it is possible to increase an intake and exhaust efficiency in a range, in which an amount of air is smaller, or to increase a cycle efficiency by employing the Atkinson cycle.

Meanwhile, the engine 10 of the present embodiment is operated in the 1.5-cylinder operation Or1 when the number of revolutions of the engine is up to about 2000 rpm, in the 2-cylinder operation Or2 when the number of revolutions of the engine is up to about 3000 rpm, and in the all-cylinder operation Oa in an operation state in which charging is required or an acceleration operation state. Therefore, all of the cylinders, which are in the operating state, are operated in a high-load operation state, thereby improving a fuel consumption rate and thus enhancing a fuel efficiency. In particular, the present embodiment is suitable for an engine 10 having a cylinder number Nc of an odd number, such as a 5-cylinder engine or a 3-cylinder engine.

This application is based on Japanese Patent Application No. 2015-249426 filed on Dec. 22, 2015, the entire contents of which are incorporated herein by reference.

INDUSTRIAL APPLICABILITY

The internal combustion engine and the method for controlling the same according to the present disclosure is useful in that it is possible to provide an internal combustion engine and a method for controlling the same, in which, by equally sequentially resting all cylinders, while reducing white smoke occurring upon switching from a reduced-cylinder operation into an all-cylinder operation, an operation range for the reduced-cylinder operation can be expanded and also the reduced-cylinder operation can be performed even if a cylinder number thereof is an odd number.

REFERENCE SIGNS LIST

10: Engine
11: Cylinder
12: Fuel injection valve
13: Intake or exhaust valve
20: Valve drive mechanism
30: Resting mechanism
40: Control device
Nc: Cylinder number
Oa: All-cylinder operation
Or: Reduced-cylinder operation

The invention claimed is:

1. An internal combustion engine comprising:
cylinders having a cylinder number of two or more;
a plurality of fuel injection valves and a plurality of intake or exhaust valves which are respectively arranged to the two or more cylinders;
a valve drive mechanism configured to open and close the intake or exhaust valves;
a resting mechanism configured to cancel an action of the valve drive mechanism to maintain the intake or exhaust valves in a closed state;
a control device configured to adjust the fuel injection valves and the resting mechanism and thereby executing a control of switching between an all-cylinder operation and a reduced cylinder operation, the all-cylinder operation being an operation in which a combustion cycle is always performed in all of the cylinders, and the reduced-cylinder operation being an operation in which the combustion cycle is always performed in some cylinders less than the cylinder number; and
a detection device,
wherein in the reduced-cylinder operation, all of the cylinders perform a partial operation in which an operating state and a resting state thereof are repeated,
wherein the partial operation is an operation in which the operating state, in which fuel is injected by the fuel injection valve and also the intake or exhaust valves are opened and closed by the valve drive mechanism until a combustion cycle is performed by a predetermined operating number set to be less than the cylinder number, and the resting state, in which injection of fuel from the fuel injection valves is stopped and also the intake or exhaust valves are maintained in the closed state by the resting mechanism during a period of time corresponding to one combustion cycle after the combustion cycle has been performed by the operating number, are repeated,
wherein during the reduced-cylinder operation, a timing of the resting state of each of the cylinders is different between the cylinders and also occurs sequentially for each of the cylinders,
wherein the detection device configured to detect a timing when the intake or exhaust valves are closed again after being opened, and
wherein the control device is configured to monitor the timing via the detection device and execute a control of maintaining the intake or exhaust valves in the closed state by the resting mechanism when switching the cylinder from the operating state into the resting state.

2. The internal combustion engine according to claim 1, wherein the control device is configured to execute a control of changing the operating number in the partial operation in accordance with an operation state of the internal combustion engine.

3. The internal combustion engine according to claim 2, wherein the operating number in the partial operation becomes smaller from a case where the operation state of the internal combustion engine is a high load state in which a number of revolutions of the engine and an output torque therefrom are high toward a case where the operation state of the internal combustion engine is a low load state in which the number of revolutions of the engine and the output torque therefrom are low.

4. The internal combustion engine according to claim 1, wherein when switching the cylinder from the operating state into the resting state, the control device is configured to execute a control of maintaining, by the resting mechanism, the intake or exhaust valves for intake in the closed state from a bottom dead center after an intake stroke in the operating state until a second bottom dead center as counted from the bottom dead center and also maintaining, by the resting mechanism, the intake or exhaust valves for exhaust in the closed state from a top dead center after an exhaust stroke in the operating state until a second top dead center as counted from the top dead center.

5. The internal combustion engine according to claim 1, wherein the valve drive mechanism has a cam profile used for the all-cylinder operation and a cam profile used for the reduced-cylinder operation for one intake or exhaust valve, and
wherein the control device is configured to switch between the cam profiles by the valve drive mechanism upon switching between the all-cylinder operation and the reduced-cylinder operation.

6. The internal combustion engine according to claim 1, wherein the cylinder number is an odd number.

7. A method for controlling an internal combustion engine, in which a plurality of fuel injection valves which are configured to respectively inject fuel into cylinders having a cylinder number of two or more and a resting mechanism which is configured to cancel an action of a valve drive mechanism, which is configured to open and close a plurality of intake or exhaust valves so as to allow intake and exhaust to and from the cylinders, to maintain the intake or exhaust valves in a closed state are adjusted, thereby switching between an all-cylinder operation in which a combustion cycle is always performed in all of the cylinders and a reduced-cylinder operation in which the combustion cycle is always performed in some cylinders less than the cylinder number, the method comprising:

causing all of the cylinders to perform a partial operation in which an operating state and a resting state thereof are repeated, during the reduced-cylinder operation, wherein the partial operation is an operation in which the operating state, in which fuel is injected by the fuel injection valves and also the intake or exhaust valves are opened and closed by the valve drive mechanism until a combustion cycle is performed by a predetermined operating number set to be less than the cylinder number, and the resting state, in which injection of fuel from the fuel injection valves is stopped and also the intake or exhaust valves are maintained in the closed state by the resting mechanism during a period of time corresponding to one combustion cycle after the combustion cycle has been performed by the operating number, are repeated, and wherein during the reduced-cylinder operation, a timing of the resting state of each of the cylinders is different between the cylinders and also occurs sequentially for each of the cylinders;

detecting a timing when the intake or exhaust valves are closed again after being opened; and monitoring the timing and executing a control of maintaining the intake or exhaust valves in the closed state by the resting mechanism when switching the cylinder from the operating state into the resting state.

* * * * *